INVENTOR.
Paul Almeras
BY George H. Cadrey
ATTORNEY

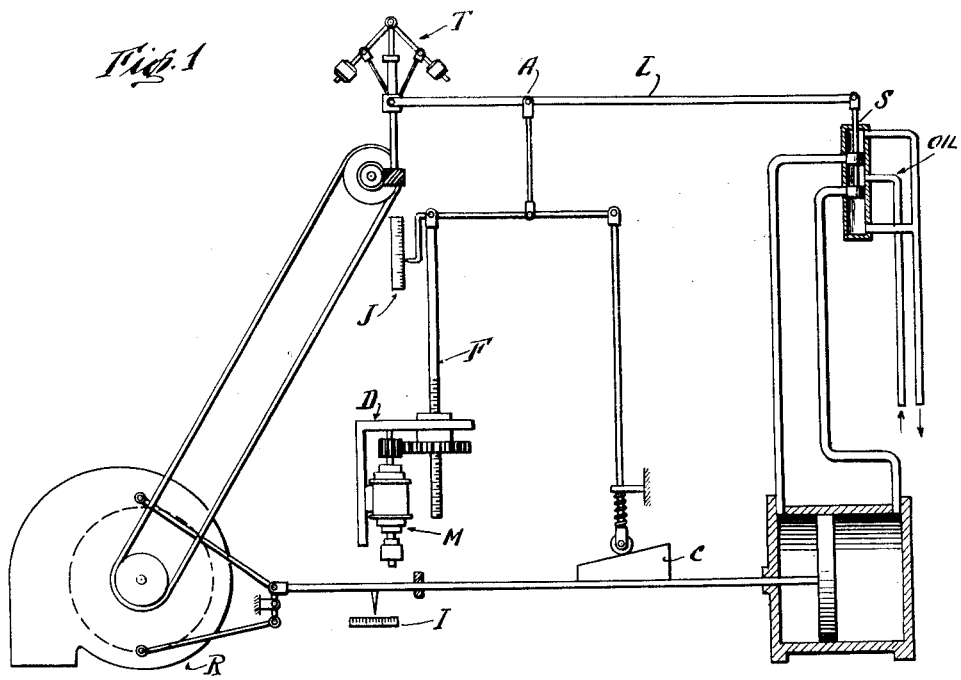
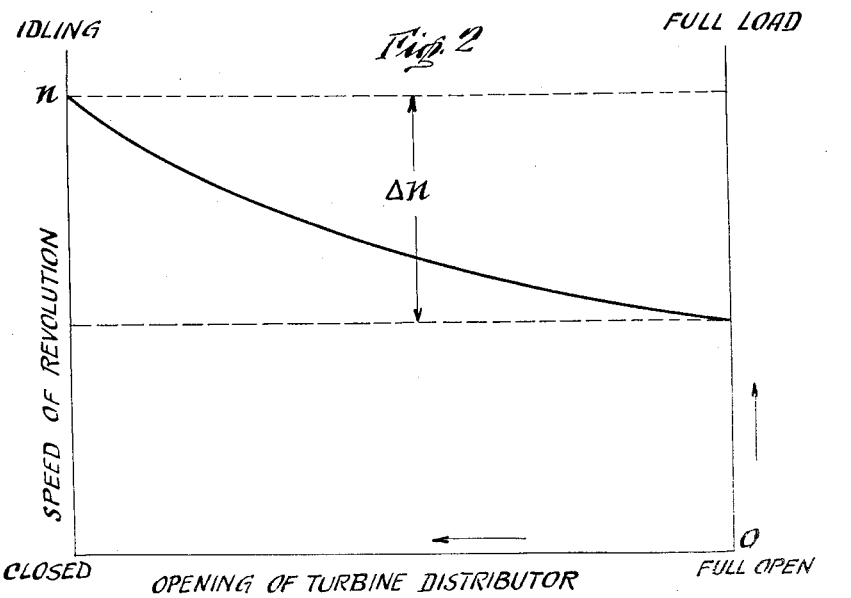

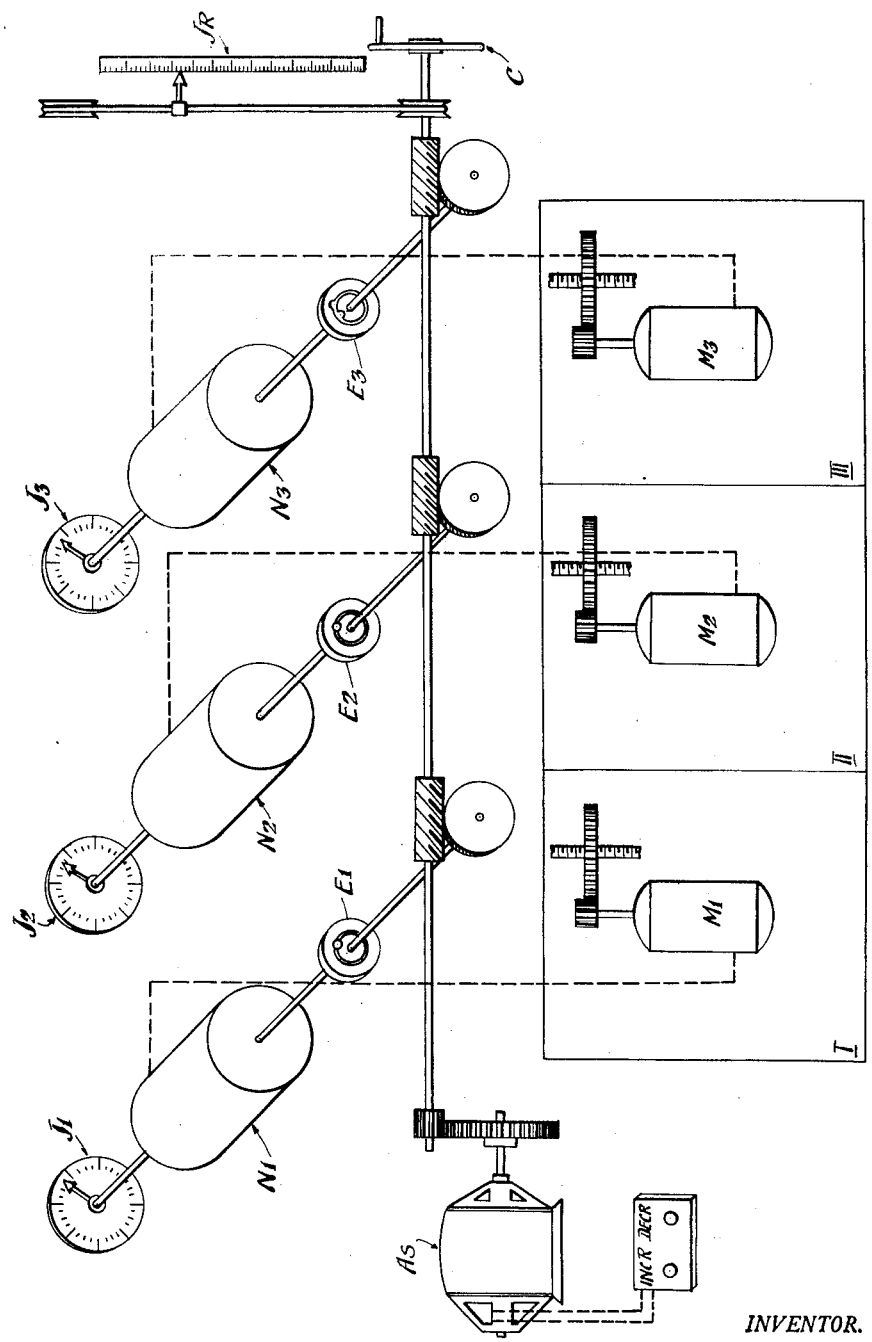

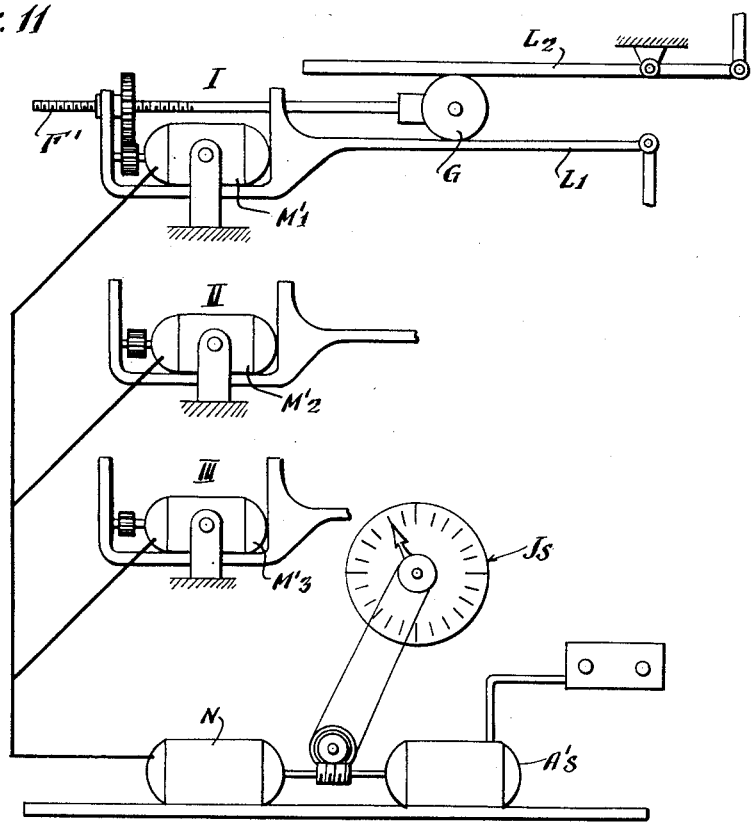
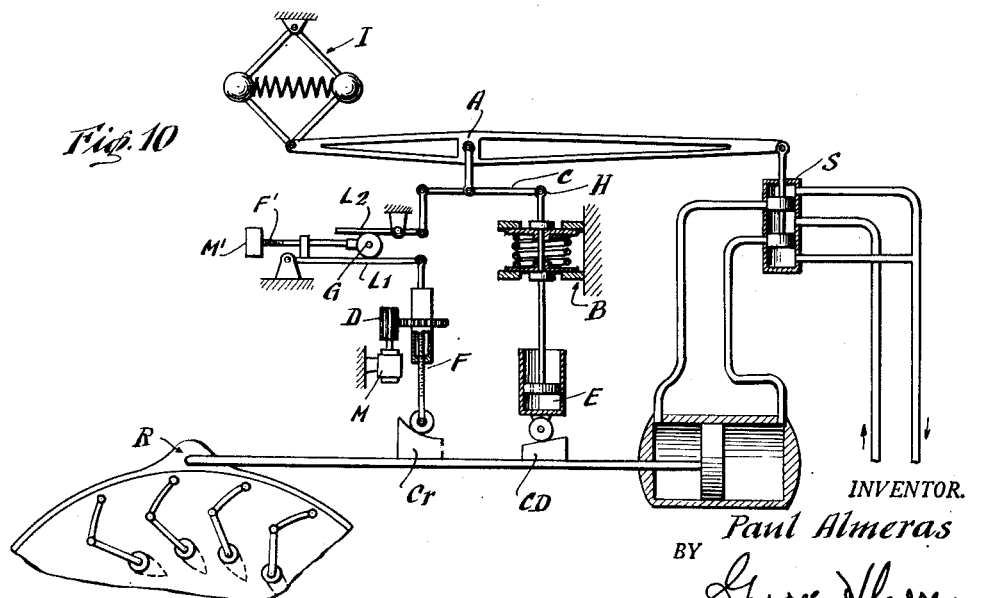

July 17, 1951

P. ALMERAS 2,560,914

REGULATION OF AN ASSEMBLY OF
ELECTRIC GENERATING UNITS

Filed Feb. 26, 1948

INVENTOR.
Paul Almeras
BY George H. Corey
ATTORNEY

Patented July 17, 1951

2,560,914

UNITED STATES PATENT OFFICE 2,560,914

REGULATION OF AN ASSEMBLY OF ELECTRIC GENERATING UNITS

Paul Almeras, Grenoble, France, assignor to Ateliers Neyret-Beylier & Piccard-Pictet, Grenoble, France, a corporation of France Application February 26, 1948, Serial No. 11,138
In France November 15, 1940

Section 1, Public Law 690, August 8, 1946
Patent expires November 15, 1960

12 Claims. (Cl. 290—4)

In current practice, governors for synchronous machines, for instance those comprising turbines driving alternators, provide for a stable distribution of the load between a plurality of machines connected up in parallel. Such load division however, in the majority of cases, is not predetermined beforehand; it is effected in a haphazard manner and as a rule it is neither the most convenient nor the most economical one among all those which might be obtained.

It has already been suggested, as see the French Patent No. 563,760 of June 17, 1922, to secure by means of automatic devices a division or partition of the load between several machines. But this arrangement has led to the provision of a costly electrical superregulating system which so far has only been installed in a very small number of electric power plants. In the great majority of cases load division remains subject of the individual manual adjustment of each machine.

The improvements which form the subject matter of present invention are for the purpose of ensuring in a more simple manner, and through the exclusive use of governors, an automatic division of the load between a plurality of synchronous machines according to any law which may be judged desirable and thereby facilitating the operation and control of such machines.

Speed-governor type regulators are often provided in connection with synchronous machines coupled to a common load which imposes on all of them a similar speed of rotation. For instance turbines driving alternators coupled to a common power network are provided with governors of which an example is shown in Fig. 1 of the attached drawings.

This governor is adapted under tachometer control to act on one of the operational characteristics or factors of the machine, for instance the rate of flow of the drive fluid. In Fig. 1 a speed governor T is shown actuating by means of the valve S of a servo-motor, the control gate R of a hydraulic turbine.

It is furthermore known that in order that the power division may be obtained in a stable and definite manner between the machines, it is advantageous to impart to each governor a pre-determined inherent speed droop. Each governor will then be adapted to regulate its related machine at a different speed according to the power output required thereof.

Fig. 2 shows by way of example such a regulation characteristic wherein the speed of revolution $n$ is plotted along the ordinates while the opening O of the turbine control gate is measured along the abscissae. Such a curve may be called a "Speed droop characteristic." The inherent speed droop or "coefficient of static irregularity" may be defined as the difference $\Delta n$, between the speed of rotation of the machine in idling operation and the speed at full load (Fig. 1). Occasionally the term speed droop may also be used hereinafter to designate the slope of the characteristic curve at a given point.

In known forms of construction, the speed droop characteristic is determined by a suitable power-feedback path provided from the outlet of the governor to the tachometer. For instance as shown in Fig. 1 the speed droop is obtained through the action of a so-called "speed droop" or "distribution" cam $Cr$ adapted to react as at A upon the floating lever L of the tachometer and driven through a rod system from the distributor R.

Fig. 3 shows in what way the distribution of the load between two machines is determined as a result of the relative positioning of the speed droop characteristics of said machines. The speed of revolution $n$ is plotted along the ordinates while the abscissae represent, in the left hand and middle section of the figure, the power outputs W1 and W2 respectively supplied by both machines and, in the right hand section, the corresponding total power output W. The total power output indicated at $rR$ is for instance divided between both machines as follows:

$$W_1 = mM \text{ and}$$
$$W_2 = pP \text{ with}$$
$$W = W_1 + W_2$$

In order to modify the power distribution according to requirements, control devices are currently used such as D (Fig. 1) the effect of which is to shift, separately for each individual turbine, the speed droop characteristic. In the exemplary embodiment shown in Fig. 1 the threaded rod F controlled from the motor M by means of a threaded bushing is adapted to bodily shift the speed droop characteristic of the machine in a direction parallel with the axis of the speeds of revolution (Fig. 4). This device will be herein termed "distribution-control."

The load distribution is generally determined, in current installations, either by the rate of opening of the control gate or by the actual setting of the distribution control. In Fig. 1, this indication is given by the displacement of suitable pointers I and J opposite calibrated rulers; in some cases such readings are caused to be repeated at a remote location for instance on a control panel.

It is an object of the present invention to provide for the automatic distribution of the load exclusively through correlated action upon the speed droop characteristics of the machines.

The control devices D are then no longer controlled individually but as a bodily unit through a common control member adapted to bodily shift them by amounts bearing a predetermined correlation with each other.

Actuation of said single control means will therefore result in varying the total power-output supplied by the plant, while maintaining the law of distribution as imposed by the operation of the speed droop mechanism, which then will be designed in accordance with said law. By way of example such a mechanism may include distribution cams the contour of which is predetermined so as to follow said law.

The device according to the invention has the advantage of great simplicity, while providing a degree of accuracy which is often greater than that obtainable in the so-called "electric super-regulating systems." The reason is that rather than determining the distribution of the load as from the power output of the machine, the device according to the invention determines said division in accordance with the rate of opening of the control gate. Now it can be proved that by the above method a proper load distribution is preserved without substantial error when the pressure of the drive fluid is varied, whereas where the load distribution is determined according to the power output, the load distribution soon becomes imperfect after the pressure has departed from its normal value.

Another object of the invention is to make it possible to selectively disconnect one or more machines from said common control means and to control them separately. This feature is particularly useful when starting or stopping a unit.

The common control according to the invention may be achieved by using any one of a number of known systems, for instance remote controls or order-repeating systems.

In brief, such a control will modify the speed droop characteristic of each machine without altering the inherent speed droop thereof. Said characteristic is bodily shifted parallel with the speed reference axis (Fig. 5).

However a complete regulator device will further comprise an additional adjusting means which should make it possible to modify both the inherent speed droop and the speed droop characteristic. A pointer is generally used to determine the setting for such adjustment, either upon the regulator itself or at a remote location on a control panel for the machine.

Certain known speed droop adjusting devices have the effect of modifying the speed droop characteristic while preserving a fixed point I thereof (Fig. 6) which may be termed an "indifferent." When the machine operates in the conditions corresponding with this point, the inherent speed droop may be altered without interfering with the operation of the machine.

In known arrangements the indifferent point I, if any, is displaced according to a haphazard and usually a somewhat intricate law, whenever, as a result of the distribution control means, the speed droop characteristic is caused to be displaced (Fig. 7). It is therefore an exception when the speed of operation of the machine coincides with an indifferent point of the characteristic. Generally speaking, after the inherent speed droop has been altered, it is necessary to readjust the distribution control means in order to return to the initial speed of operation. This makes it more difficult to secure an overall adjustment of the assembly of units, particularly when the automatic load distribution is secured through the use of distribution cams having correlated profiles and a common distribution control, as described hereinabove.

Thus a further object of the invention is to cause the operation of the distribution control means to displace the indifferent point according to a suitable preselected law. Preferably said displacement will be effected according to the law of regulation which the assembly of all the governors participating in the proper control of the installation tend to impose to said machine; the latter will then continually operate at its indifferent point. In particular in the very frequent instance where it is desired to maintain the condition to be controlled, e. g., speed, at a constant valule, the indifferent point will have to move along the horizontal line extending through the normal (speed) adjusting setting (Fig. 8).

Finally, it is known that the operational stability of a prime mover, such as a turbine for instance, taken individually requires the use either of an accelerometer device or that of a temporary restoring systems adapted to temporarily impart to the governor a high degree of speed droop while said governor is acting to regulate the power output, said provisional or momentary speed droop gradually disappearing as the machine reaches a new point of operation.

In those governors which comprise speed droop adjusting means, it is important that said adjustment should not affect the value of the momentary speed droop which latter is necessary for assuring operational stability in the machine. The "static" or permanent speed droop which is that shown in Figs. 3 to 8 is necessary to distribute or divide, according to the operator's desire, the power output between several electric generating units for instance.

Thus a still further object of the invention will be to provide a regulator device of such character that speed droop adjustment therein will not modify the value of the provisional temporary restoring action and will therefore in no way affect the operational stability of the machine.

In known embodiments of governors the condition to be controlled (speed, power output and the like) is adapted to act through an appropriate device, such as a tachometer for instance and by means of a restoring system, upon the adjusting means for the prime mover. Said restoring system, which provides the desired permanent speed droop characteristic, is provided with adjusting means enabling the speed droop characteristic to be shifted so as to allow the load on the machine to be varied at will. In order that the operational stability of the prime mover shall not be impaired during adjustment of the slope of the speed droop characteristic it is desirable according to the invention to so arrange the temporary restoring system as to cause it to act, independently of the permanent restoring means, on the connection between the apparatus which is a funtcion of the condition to be controlled and the adjusting means for the prime mover.

As a conclusion to this introductory section of the specification, it may thus be said that among the main objects of this invention are:

To provide for an automatic distribution of the load between the various parallel-coupled units through the exclusive action of a correlation between the individual characteristics of said units;

To enable adjustment of the speed droop of each governor without interfering with the load distribution between the units;

To provide means whereby the adjustment of the speed droop of a given governor will not interfere with the operational stability of the machine controlled by said governor.

Further objects and features of the invention will appear from the ensuing disclosure and claims when taken in reference with the accompanying drawings, wherein:

Fig. 1 diagrammatically illustrates a speed-governor regulating system for a synchronous machine of known type.

Figs. 2 to 8 show various regulational characteristics (all the above figures have already been referred to in the foregoing disclosure).

Fig. 9 is a diagrammatic illustration of a "load distribution control" means according to the invention.

Fig. 10 is a diagrammatic illustration of a speed-governor regulating system according to the invention.

Fig. 11 is a diagrammatic illustration of a modification of the load distribution control means of the invention.

Corresponding elements have been designated by similar references in all of the Figures 1, 10, 11.

Figure 3:
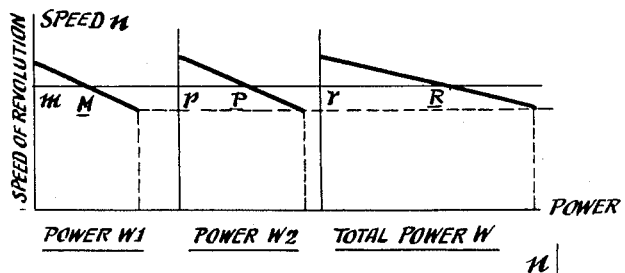
Figure 4:
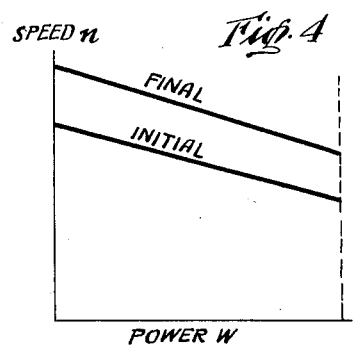
Figure 5:
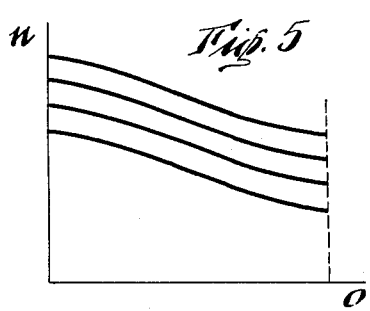
Figure 6:
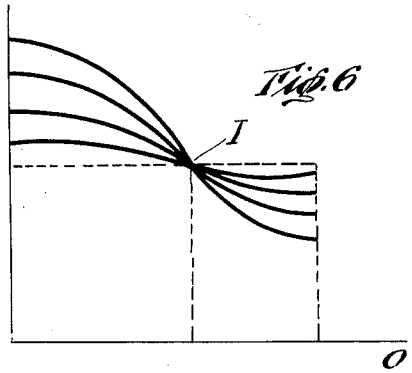
Figure 7:
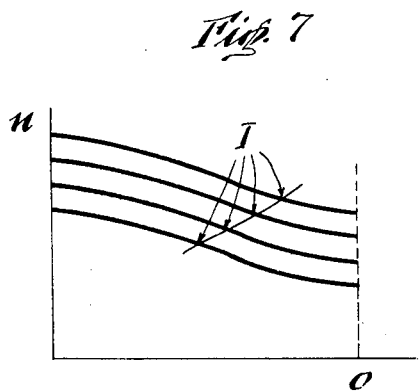
Figure 8:
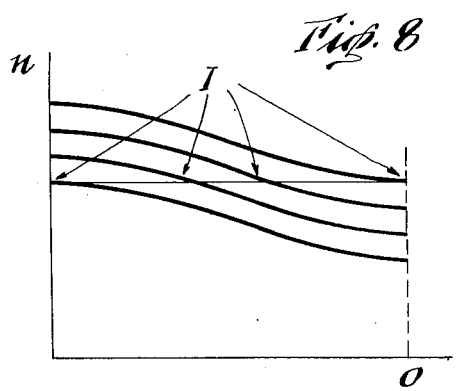

Now referring to Fig. 9, there is shown an exemplary embodiment of a load distribution control system according to the invention. It is assumed that a certain number of machines I—II—III (the number of machines is restricted to three in the ensuing description for purpose of clarity) are each equipped with a speed-governor regulating system of the type diagrammatically illustrated in Fig. 1. As stated above in connection with said figure, it is possible to bodily shift the speed droop characteristic of each machine parallel with the speed reference axis (Figs. 4-5) through the use of the control device D actuated through a motor M.

In the exemplary form shown, such a motor is associated with each of the governors for the machines I—II—III, the respective motors being designated M1—M2—M3. In the embodiment shown the system comprises a remote control device using synchronous motors. The three motors M1, M2, M3 are connected with three further synchronous motors N1, N2, N3 which are controlled through a gearing from a common handwheel C or a common asynchronous motor As.

Each of the synchronous motors N1, N2, N3 may be uncoupled as through clutches E1, E2, E3 from its related gearing, the corresponding machines thus being removed from the common control system; thus, as shown in Fig. 9, the machine III is released from common control.

Furthermore pointers JR, J1, J2, J3 are arranged to indicate for instance on a central control panel, the positions of the shafts of the synchronous motors N1, N2, N3 and of the common control handwheel C.

The above device offers as compared with currently used power plant control systems the advantage of automatically producing a desired correlation, which may be the optimum one, between the machines and thereby enable the most economical type of operation to be followed. Moreover by making a reading of the setting of the common control pointer JR together with the repeat indication of the individual pointers for each machine, it is possible to ascertain and adjust with great simplicity and without being disturbed by any transient disturbances, the overall power output of the plant.

It has been shown hereinabove that with a governor similar to the one diagrammatically illustrated in Fig. 1, it would not be possible to act upon the speed droop adjustment without interfering with the automatic distribution of the load as realized with a division control means of the type just described in connection with Fig. 9.

For this reason, said control device is preferably associated with governors as modified according to Fig. 10, now to be described.

The speed droop adjustment is secured through a known method which consists of modifying, by means of a roller G adapted to be shifted through a screw rod F', the ratio between the length of the lever arms L1, L2. The screw rod F' may be controlled from a motor M'. The distribution control is secured just as in the case of Fig. 1, by means of a control device D actuated from a motor M.

The fact that the distribution control means D is arranged between the distribution cam Cr and the speed droop adjusting means rather than being placed as in conventional devices in the speed droop adjusting means itself, or between the latter and the point A, has the effect of locating the indifferent point at a fixed speed, regardless of the setting of the distribution control means D. This is so because the indifferent point is obtained when the levers L1 and L2 are parallel with each other. Since the position of the lever L2, when the governor is in a balanced condition, depends only upon the position of the tachometer, parallelism between L1 and L2 will be preserved as long as the speed of revolution remains unchanged. Preliminary adjustment makes it possible to obtain such a relative position when the tachometer is at its normal speed setting.

The operation of the system shown in Fig. 10 may be briefly described as follows. It will first be assumed that the parts are in the positions shown in the drawing and that the speed of the prime mover increases. The tachometer T responds to the increase in speed by raising the left end of the floating lever, which pivots about A, thereby moving the pilot valve S downwardly. This movement of the valve S causes fluid under pressure to be supplied to the right end of the servomotor and the left end of the servomotor to be connected to a fluid drain. This causes the piston to move to the left, thereby moving the gate valve mechanism R in a closing direction, so as to decrease the speed of the prime mover to its previous value. At the same time, the cam CD lifts the right end H of the lever C and thereby lifts the point A on the floating lever so as to restore the pilot valve S to its initial position and stop the movement of the servomotor. The cam CR at the same time lowers the rod F, thereby rotating lever L1 clockwise and lever L2 counterclockwise. This action tends to lift the point A of the floating lever and also to restore the pilot valve S to its initial position.

If the speed of the prime mover decreases, the movements just described take place in the opposite sense, thereby opening the control gate R and restoring the pilot valve S to its normal position.

The system illustrated in Fig. 10 is designed to control a prim mover driving an alternator connected in parallel with other alternators. The "flywheel effect" of such a system of alternators is such that the speed of the prime mover will not vary substantially from the value corresponding to the frequency of the system. Therefore, for all stable conditions of operation, the position of the left end of the floating lever is fixed by the tachometer T. Also, the position of the right end of the floating lever under stable conditions is fixed, being that position at which the valve S is closed. Consequently, the normal position of the floating lever is completely fixed.

With the lever in its normal position, the lengths of the different links may be selected so that the levers $L_1$ and $L_2$ are parallel and in contact with the roller G.

Under these conditions, the total droop of the system can be adjusted by moving the roller G manually or by the motor M'. A movement of the roller G to the left, for example, will increase the effective length of one arm of the lever $L_2$ and will decrease the effective length of one arm of the lever $L_1$. This action takes place without rotating either of the levers $L_1$ and $L_2$ about their fulcrums. Consequently, such an adjustment of the roller G will change the ratio between a given increment of speed and the increment of movement of the control gate R produced in response thereto without disturbing either the speed or the position of the control gate.

Assuming now that it is desired to operate the distributor D so as to increase the power output, then the distributor D is operated to reduce the length of the link F. The right end of lever $L_1$ is lowered, carrying the roller G and the left end of lever $L_2$ downward. The right end of lever $L_2$ is thereby raised, lifting the point A and thereby the stem of valve S. The left end of the cylinder of the servomotor is placed under pressure and the piston rod is moved to the right, opening the control gate R so as to increase the supply of motive fluid to the turbine.

At the same time, the cam CR raises the lower end of the link F and returns the levers $L_1$ and $L_2$, the point A and the stem of valve S to their original positions corresponding to the system speed.

It may be noted that the cam CD also acts in a sense to lower the point H simultaneously with the action of the cam CR. This action is secondary, because the point H is always returned to the same position under the influence of spring B.

Under these conditions, whenever the action of the reguaitor ceases, the prime mover is at the system speed, which does not change, then the floating lever and lever $L_2$ are in their original positions and levers $L_2$ and $L_1$ are again parallel, although the rate of flow of fluid to the turbine is changed. With the levers $L_1$ and $L_2$ parallel, it is again possible to change the total droop by adjustment of the screw rod F', without changing the power output of the turbine.

If the power of the turbine is to be decreased, the operation is similar to that just described, except that the link F is elongated and the various parts of the regulator move in an opposite sense.

The speed droop adjusting device comprising levers $L_1$ and $L_2$ and the shiftable roller G, as well as the load adjusting device D (the distribution control means) are adapted to displace the point A by means of the lever C with one end of which they are connected, the opposite end H of said lever being connected with a known device providing a temporary speed droop adjustment.

Such a device may in particular be built as shown by way of example in Fig. 10. The end H of the lever C is connected with the piston of an oil-operated dashpot E and is continually urged back to a fixed position through spring abutment means B. The dashpot cylinder is operatively coupled with the servomotor through a cam CD.

During a displacement of the servomotor, the cam CD by means of the dashpot shifts the point H and consequently the point A, imparting a certain degree of speed droop to the governor. As a result of the action of the spring B the piston is shifted relative to the dashpot cylinder, the rate of release being controlled through the cross sectional area of the restricted aperture formed in the dashpot piston, and after a certain period of time the point H will have been restored to its initial position, and the restoring action produced by the cam CD will have then disappeared.

It will be clear that as a result of this device the degree of temporary speed droop is caused to be independent of the permanent speed droop adjustment as effected through the motor M' for instance. Thus it is assured that the regulation effected by said motor will not impair the stability of the unit.

In view of the above, it becomes possible to place the speed droop adjustment movements for a plurality of machines under the control of a common control means as for instance through any known remote control and/or order repeating system. Said adjustments will thus bear a definite relationship with each other as between the individual units.

This feature is of particular interest in connection with a plan wherein the load division is automatically provided for by the action of a distribution cam Cr through the distribution control means as described above in connection with Fig. 9. It will then be possible advantageously to correlate in a similar manner the speed droop adjusting means, in such a way that for any given setting of the central control thereof (handwheel C or pointer Jr as shown in Fig. 9) all the machines will have a common static inherent speed droop.

Fig. 11 shows an exemplary embodiment of such a device using an order repeater comprising synchronous motors, and as applied to the three machines I, II, III already discussed in connection with Fig. 9.

The speed droop adjusting means (screw rods F') for all three machines I, II, III are driven from three synchronous motors M'1, M'2, M'3, actuated by a common synchronous pilot transmitter N. The setting of its shaft is adapted to indicate at JS the static inherent speed droop actually provided. An asynchronous motor A's makes it possible to actuate the transmitter in either one or the other direction as desired.

Figure 12:
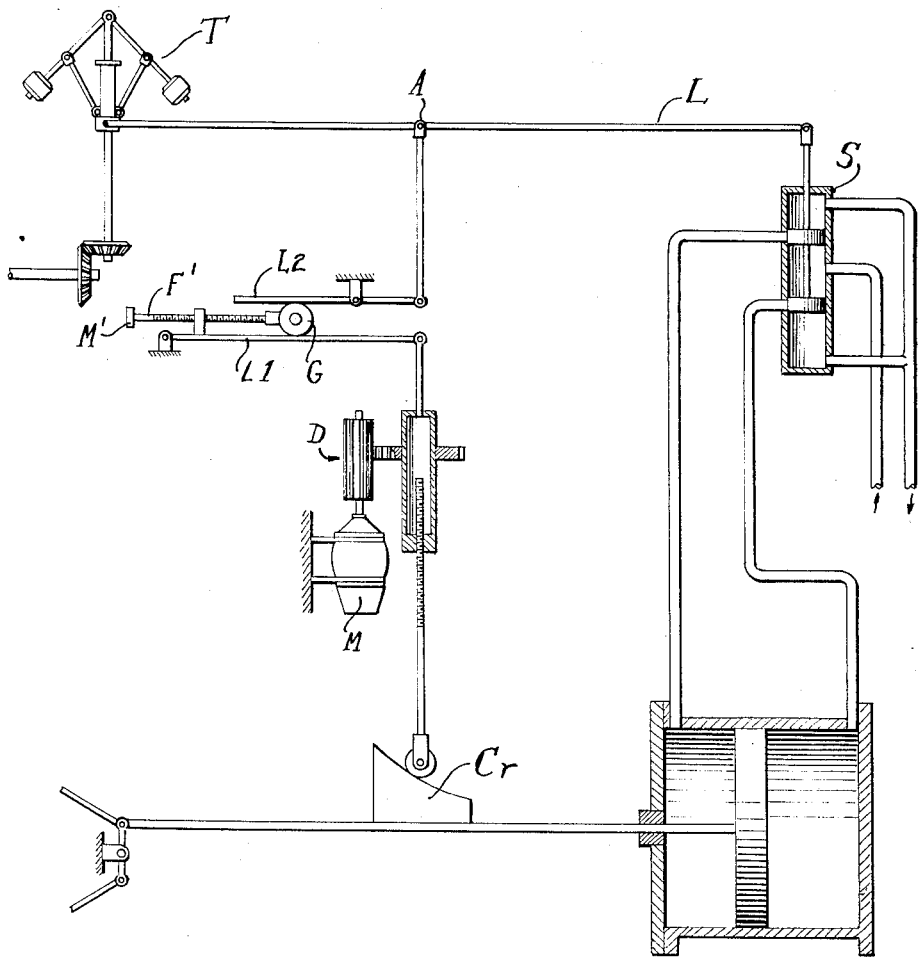
Fig. 12 is a diagrammatic illustration of a modified form of the speed-governor regulating system of Fig. 10.

Fig. 12 shows a modified form of the regulating system of Fig. 10, in which the temporary follow-up mechanism is omitted. The remaining parts correspond to those shown in Fig. 10, and have been given the same reference characters. As pointed out above, the temporary follow-up mechanism is effective only during and shortly after a displacement of the servo-motor, and it may be omitted from the system in some cases. The operation of the various parts of the system of Fig. 12 has been described in the discussion of Fig. 10 above.

What I claim is:

1. A regulating device for a group of electric power generating units operating in parallel and supplying a variable load to an electric network which comprises in combination: a speed governor individually associated with the prime mover of each of said units, and means associated with each of said governors for bodily shifting the speed droop characteristic of said governor; and a load distribution control means connected in common to said speed droop characteristic shifting means and providing for the distribution of said variable load according to a predetermined law of partition between said units through the action of said speed droop characteristic shifting means.

2. A device as in claim 1 wherein a motor associated with each of said governors actuates said speed droop characteristic-shifting means and all of said motors are driven from a common control.

3. A device as in claim 1 wherein each governor has associated therewith a motor for actuating the related one of said speed droop characteristic-shifting means, and a repeating motor coupled with said first mentioned motor and adapted to actuate a pointer cooperating with a central control panel in such a way that the positions of the speed droop characteristics of the various governors of the group may be determined by reference to said central panel.

4. A regulating device for a group of electric power generating units operating in parallel and supplying a variable load to an electric network, which comprises in combination: speed governors each associated with the prime mover of each of said units, and means associated with each of said governors for bodily shifting the statism characteristics thereof; a motor to drive said shifting means; a repeating motor coupled with said first motor and adapted to displace a pointer over a central control panel; a common control means simultaneously controlling all of said motors, whereby it is possible from said common control means to vary the overall load supplied by said assembly without causing the load distribution therein to depart from a preselected load distribution setting as indicated on said control panel by said pointers.

5. A device claimed in claim 4 which comprises means for uncoupling and coupling each of said motors from and to said common control means.

6. A regulating device for a group of electric power generating units operating in parallel and supplying a variable load to an electric power network which comprises in combination: a speed regulator associated with the prime mover of each of said units and, in association with each said regulator; firstly means for shifting the speed droop charactreistic of said regulator, and secondly means for rocking said speed droop characteristic about an indifferent point thereof; said indifferent point being coincident with the point of adjustment imposed by said electric speed droop shifting means, and load distribution control means connected in common to said means for shifting the speed droop characteristics of said units and to said means for rocking said speed droop characteristics, whereby said machines once adjusted will continue to operate at said indifferent points thereof.

7. The device claimed in claim 6 wherein said characteristic rocking means are in each governor actuated through a motor, all of said motors being remotely controlled through a common control from a central control panel, whereby the speed droop of said group of units may be adjusted.

8. In a regulating system for a group of electric power generating units operated in parallel to supply an electric power network with a variable load, wherein in the prime mover of each unit, a speed governor is associated with a tachometer actuating in known manner by means of a floating lever a distributing means for said prime mover, the provision of two feedback paths from said distributing means to said floating lever, one of said paths comprising a load distribution cam rigid with said distributing means, a rod actuated from said cam and having a length adjustable by the action of a load-dividing means, and a linkage system of adjustable ratio adjustable by the action of a speed droop control means; and a second path comprising a provisional restoring cam, a dashpot actuated by said cam, and a resilient connecting member from said dashpot to said floating lever, whereby the provisional restoring impulses are transmitted to said floating lever independently of the action exerted on said floating lever by said distribution cam over said first-mentioned path.

9. A regulating system for a group of electric power units associated in parallel and supplying a variable load to an electric network, which comprises, for each unit of said group, a speed governor having means for shifting the speed droop characteristic of the unit and means for rocking the same about the current operational point, load distributing means connected in common to and acting on said shifting means, and speed droop controlling means acting on said rocking means, whereby the load may be distributed among said units of said group in accordance with a predetermined law and the speed droop characteristic of said group may be changed without change of the distribution of the load among said units.

10. Speed control apparatus for a prime mover supplied with a motive fluid, comprising means responsive to the prime mover speed, means for controlling the flow of motive fluid to the prime mover, a motor for positioning said flow control means, means for controlling said motor and having an inactive position in which the motor is stationary, a floating lever connecting the speed responsive means to the motor control means and effective upon movement of said speed responsive means to move the motor control means away from said inactive position so as to cause operation of the motor, restoring means including a cam driven by the motor, a follower for the cam, and means connecting the follower to the floating lever, said restoring means being effective upon operation of the motor to restore the motor control means to its inactive position and stop said operation, so that a given speed increment produces an increment of movement of the flow control means, said connecting means including load distribution control means connected to said follower and speed droop control means connected between said load distribution control means and said floating lever, said speed droop control means comprising a first control member connected to said floating lever for concurrent movement therewith, a second control member connected to said load distribution control means for concurrent movement therewith, said control members having respective predetermined positions when said motor control means is in said inactive position and said speed has a predetermined value, and means cooperatively associated with said control members and operable while the members remain fixed in said positions to vary the relative effects of said members on said motor control means and thereby to vary the ratio between said speed increment and said increment of movement.

11. Speed control apparatus for a prime mover supplied with a motive fluid, comprising means responsive to the prime mover speed, means for controlling the flow of motive fluid to the prime mover, a motor for positioning said flow control means, means for controlling said motor including said speed responsive means and restoring means driven by said motor and acting upon said motor control means so that a given increment of speed produces an increment of movement of the flow control means; said restoring means including a first lever connected to said speed responsive means, a second lever connected to said flow control means, said levers extending substantially parallel to each other and having fulcrums spaced longiutdinally of the levers, and a bearing member located between and engaging both levers; and means for moving said bearing member along said levers so as to simultaneously increase the effective length of one arm of one lever and decrease the effective length of one arm of the other lever while said levers remain parallel and thereby to vary the ratio between said speed increment and said increment of movement while the positions of said speed responsive means and of said flow control means remain fixed.

12. Speed control apparatus for a prime mover suppled with a motive fluid, comprising means responsive to the prime mover speed, means for controlling the flow of motive fluid to the prime mover, a motor for positioning said flow control means, means for controlling said motor and having an inactive position in which the motor is stationary, restoring means driven by the motor, means connecting the speed responsive means and the restoring means to the motor control means and effective upon movement of said speed responsive means to move the motor control means away rom said inactive position and to cause operation of the motor until the restoring means acts to restore the motor control means to its inactive position and stop said operation, so that a given speed increment produces an increment of movement of the flow control means, said connecting means including a first control member connected to said speed responsive means for concurrent movement therewith, a second control member connected to said restoring means for concurrent movement therewith, said control members having respective predetermined positions when said motor control means is in said inactive position and said speed has a predetermined value, and means cooperatively associated with said control members and operable while the members remain fixed in said positions to vary the relative effects of said members on said motor control means and thereby to vary the ratio between said speed increment and said increment of movement.

PAUL ALMERAS.

REFERENCES CITED

The following references are of record in the file of this patent:

UNITED STATES PATENTS

| Number | Name | Date |
|---|---|---|
| 1,558,529 | Wunsch | Oct. 27, 1925 |
| 1,762,672 | Spennemann | June 10, 1930 |
| 1,863,302 | Geiselman | June 14, 1932 |
| 1,984,920 | Doyle | Dec. 18, 1934 |
| 1,984,940 | Plechl | Dec. 18, 1934 |
| 2,010,594 | Kerr | Aug. 6, 1935 |
| 2,015,555 | Fountain | Sept. 24, 1935 |
| 2,039,426 | Kerr | May 5, 1936 |
| 2,050,338 | Kerr | Aug. 11, 1936 |
| 2,054,121 | Doyle | Sept. 15, 1936 |
| 2,054,411 | Doyle | Sept. 15, 1936 |
| 2,228,153 | Pfau | Jan. 7, 1941 |
| 2,341,384 | Kalin | Feb. 8, 1944 |
| 2,366,968 | Kaufmann | Jan. 9, 1945 |
| 2,418,388 | Ziebolz | Apr. 1, 1947 |

FOREIGN PATENTS

| Number | Country | Date |
|---|---|---|
| 212,872 | Germany | Aug. 13, 1909 |
| 208,139 | Switzerland | Apr. 1, 1940 |
| 438,868 | Germany | Dec. 31, 1926 |

Certificate of Correction

Patent No. 2,560,914      July 17, 1951

PAUL ALMERAS

It is hereby certified that error appears in the printed specification of the above numbered patent requiring correction as follows:

Column 3, lines 61 and 62, for 'an "indifferent." When' read *an "indifferent point." When*; column 4, line 70, for "funtcion" read *function*; column 7, line 6, for "prim" read *prime*; column 12, line 2, for "rom" read *from*;

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*